United States Patent [19]

Shibuya et al.

[11] 4,269,617
[45] May 26, 1981

[54] PROCESS FOR THE MANUFACTURE OF LIQUID CRYSTAL DISPLAY ELEMENT

[75] Inventors: Yoshimichi Shibuya; Hiromitsu Kawamura; Yasuhiko Kando; Masaharu Koyama, all of Mobara, Japan

[73] Assignee: Hitachi, Ltd., Tokyo, Japan

[21] Appl. No.: 35,529

[22] Filed: May 3, 1979

[30] Foreign Application Priority Data

May 17, 1978 [JP] Japan .................................. 53/57652

[51] Int. Cl.³ .............................................. C23C 27/00
[52] U.S. Cl. ...................................... 65/43; 65/60 A; 65/60 D
[58] Field of Search ...................... 65/43, 60 A, 60 D; 350/343

[56] References Cited

U.S. PATENT DOCUMENTS 2,248,644  7/1941  Reger et al. ................................ 65/43
3,995,941  12/1976  Nagahara et al. .................... 65/43 X

FOREIGN PATENT DOCUMENTS 52-21371  6/1977  Japan .
52-28542  6/1977  Japan .

Primary Examiner—William F. Smith
Attorney, Agent, or Firm—Craig and Antonelli

[57] ABSTRACT

A process for the manufacture of a liquid crystal container for a liquid crystal display element, which process comprises the steps of applying a low-melting glass frit paste to at least one of a pair of glass substrates, subjecting this glass substrate to primary firing in an open condition in which the paste is in no contact with any matters, and while holding the pair of the glass substrates in their accurate relative positions, subjecting the glass substrates to secondary firing to seal the pair of the glass substrates with the glass frit. The process preferably comprises the step of applying, prior to the step of secondary firing, a low-melting glass frit paste to one of the glass substrates so as to reliably hold the pair of the glass substrates in the accurate relative positions.

10 Claims, 11 Drawing Figures

U.S. Patent    May 26, 1981    4,269,617
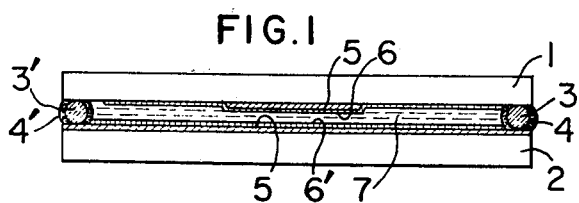
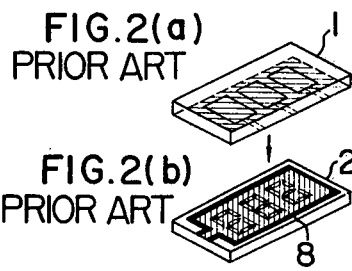
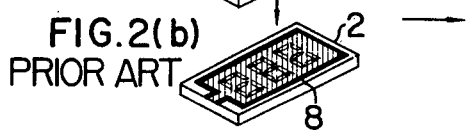
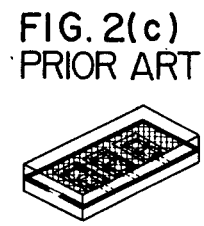
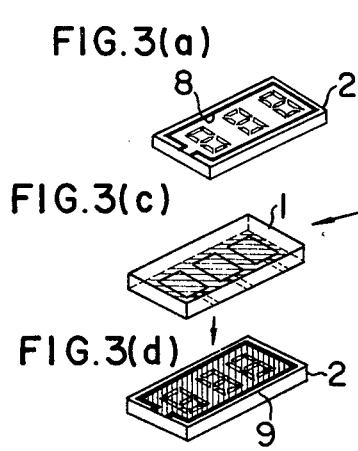
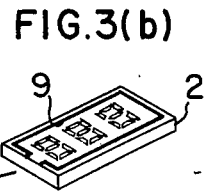
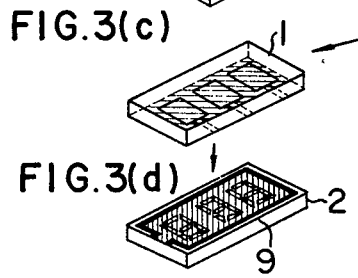
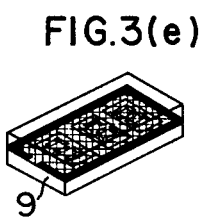
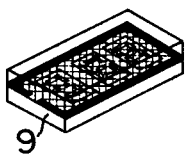
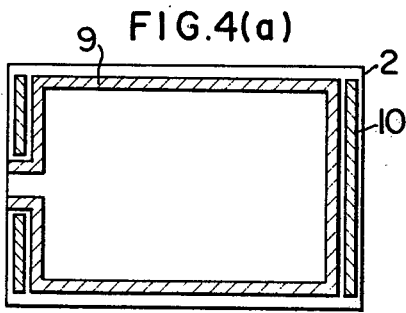
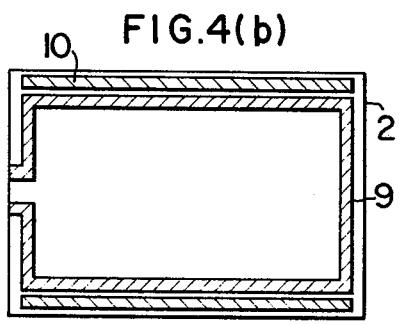

PROCESS FOR THE MANUFACTURE OF LIQUID CRYSTAL DISPLAY ELEMENT

This invention relates to a process for the manufacture of a liquid crystal display element having an improved seal at confronting peripheral areas of a pair of upglass substrates assembled together to form a liquid crystal container.

Liquid crystal display elements of field effect type are presently widely used in the field of liquid crystal display. Such a liquid crystal display element utilizes the fact that, when no electric field is applied thereto, liquid crystal molecules are oriented in one direction to exhibit their optical rotary power against incident polarized light under control of liquid crystal orientation control films formed on the confronting faces of a pair of glass substrate, while when an electric field is applied thereto, the orientation of the liquid crystal molecules is changed in response to the applied electric field resulting in disappearance of the optical rotary power of the liquid crystal molecules.

Such a field effect type of liquid crystal display element comprises, for example, a pair of glass substrates, transparent electrodes disposed respectively on the glass substrates, liquid crystal orientation control films formed respectively on the transparent electrodes, spacers disposed between the glass substrates to maintain a predetermined gap between the glass substrates, and a sealant for enclosing the liquid crystal in a container formed by the glass substrates.

When the sealing structure for enclosing the liquid crystal in the liquid crystal container of the liquid crystal display element of the type above described is incomplete or the sealing process therefor is not adequate, such undesirable phenomena as hydrolysis of the liquid crystal due to the presence of moisture and electrolysis of the liquid crystal during DC drive due to the presence of impurities in the liquid crystal tend to occur, resulting in a shortened useful service life of the liquid crystal display element. It is therefore a common practice to employ an inorganic sealant such as a low-melting glass frit to provide a satisfactory sealing structure for the liquid crystal container. A sealing process most commonly employed heretofore comprises preparing a paste by mixing low-melting glass frit powders with an organic binder and an organic solvent, coating this paste on the peripheral area of one of the glass substrates, for example, the lower glass substrate, through, for instance, a silk-screen printing method, superposing the other or upper glass substrate on the lower substrate, drying the stack at about 120° C. to evaporate the solvent, and then, subjecting the stack to firing at a predetermined temperature of 400° C. to 430° C. thereby sealing the upper and lower glass substrates at their peripheral areas with the sealant. Such a sealing process is disclosed in Japanese Utility Model Publication No. 28542/77 published on June 29, 1977 and also in Japanese Patent Publication No. 21371/77 published on June 10, 1977.

However, such prior art sealing processes have had various defects as pointed out presently. Gases produced as the result of the decomposition of the organic binder in the low-melting glass frit paste would not be fully discharged to the atmosphere due to the presence of the upper glass substrate. Consequently, the glass frit is fused while the organic binder remains incompletely decomposed, and the non-decomposed portion of the organic binder reacts with oxygen in the glass frit to produce $CO_2$ and other gases which form gas bubbles in the fused glass frit. Although the gases forming these bubbles have normally the tendency of escaping into the atmosphere from the glass surface, the liberated gases cannot freely escape into the atmosphere by being obstructed by the upper glass substrate, and the gas bubbles tend to remain in the sealed areas of the liquid crystal container of the liquid crystal display element. The presence of such gas bubbles in the sealed areas of the liquid crystal container of the liquid crystal display element has resulted in such various defects that the effective sealing width of the sealing structure insuring the fluid-tight seal is narrowed to less than the desired value, and the effective display area is also narrowed when the gas bubbles are included in the inner zones of the display area. Further, when the glass substrates are subjected to the firing treatment with the upper glass substrate superposed on the lower glass substrate, the gases produced as the result of the decomposition of the organic binder during the glass frit fusing step would be confined within the liquid crystal container resulting in contamination of the inner faces of the glass substrate. This inner face contamination by the gases are provided such another defect that the display characteristic of the liquid crystal display element is greatly deteriorated, and the useful service life of the element is also shortened. Further, the liquid crystal display element of this type must be completely sealed fluid-tight, and the narrow gap between the upper and lower glass substrates must be maintained at a predetermined value of less than 10 $\mu$m. It is thus inevitable to select a highest possible fusing temperature so as to fuse the glass frit to give a satisfactory fluidity thereto. This requirement has provided such another defect that a thermal change in the property of the liquid crystal orientation control films on the inner faces of the glass substrates gives rise to mal-orientation of the liquid crystal molecules or produces induced domains, resulting in deterioration of the display characteristic of the liquid crystal display element and shortening of the useful service life of the element.

It is therefore a primary object of the present invention to obviate the aforementioned defects of the prior art process and to provide a novel and improved process for the manufacture of a liquid crystal display element which exhibits a satisfactory display characteristic and has a long useful service life.

The process according to the present invention which attains the above object is featured by the steps of coating a paste of a sealant, preferably, a low-melting glass frit in a predetermined thickness, on a predetermined zone of at least one of a pair of substrates, for example, glass substrates, subjecting the glass substrate having this paste coating to primary firing in an open condition in which the paste coating is in contact with no other matter than the at least one of a pair of substrates, thereby fusing and fixedly depositing the glass frit on the said zone of the glass substrate to effect the so-called pre-glazing of the glass frit, positioning the glass substrate having the pre-glazed glass frit with respect to the other glass substrate to bring it in an accurate relative position opposite to the latter (for example, bringing the character display electrode cells on these glass substrates into an accurately registered relationship), and subjecting the stack of these glass substrates to secondary firing while holding these two glass substrates in their accurate relative positions by relative-position holding means, thereby integrally assembling the two glass substrates sealed at their peripheral areas with the glass frit.

Other objects, features and advantages of the present invention will be readily apparent from the following detailed description taken in conjunction with the accompanying drawings, in which:

FIG. 1 is a schematic sectional view of one form of a liquid crystal display element of field effect type;

FIGS. 2(a), 2(b) and 2(c) are schematic perspective views to illustrate the steps of sealing in a prior art process for the manufacture of the liquid crystal display element of the type shown in FIG. 1;

FIGS. 3(a), 3(b), 3(c), 3(d) and 3(e) are schematic perspective views illustrating the steps of sealing in an embodiment of the process for the manufacture of such a liquid crystal display element according to the present invention; and FIGS. 4(a) and 4(b) are schematic plan views showing relative-position holding means utilizing a low-melting glass frit paste for holding the glass substrates in their accurate relative positions, respectively.

Before describing a preferred embodiment of the present invention in detail, a prior art process will be described briefly with reference to FIGS. 2(a) to 2(c) so that the present invention can be more clearly understood.

Firstly, FIG. 1 shows the structure of one form of the aforementioned liquid crystal display element of field effect type. As seen in FIG. 1, the liquid crystal display element of this type comprises a pair of glass substrates 1, 2, spacers 3, 3', sealant 4, 4', a pair of display electrodes 5, 5' each in the form of a transparent conductive film, a pair of liquid crystal orientation control films 6, 6' for orienting the liquid crystal molecules in a predetermined direction, and a liquid crystal layer 7.

FIGS. 2(a) to 2(c) are schematic perspective views illustrating the steps of sealing in a prior art process for the manufacture of the liquid crystal display element of the type shown in FIG. 1. According to the prior art steps of sealing, a low-melting glass frit paste 8 is coated on the peripheral area of the lower glass substrate 2 as shown in FIG. 2(b), and then, the upper glass substrate 1 as shown in FIG. 2(a) is superposed on the lower glass substrate 2 to obtain a stack as shown in FIG. 2(c). The stack is dried at about 120° C. to expel the solvent from the paste, and then, the stack is subjected to firing at a predetermined temperature of 400° C. to 430° C. to seal the two glass substrates 1 and 2 at their peripheral areas by single firing treatment, as described hereinbefore. The above manner of sealing gives rise to various problems as pointed out already hereinbefore.

FIGS. 3(a) to 3(e) are schematic perspective views illustrating the steps of sealing in the process according to the present invention. Referring to FIG. 3(a), a paste 8 of a low-melting glass frit is coated on the peripheral area of at least one of the upper and lower glass substrates 1 and 2. In FIG. 3(a), the paste 8 is applied to the lower glass substrate 2. Subsequently, the lower glass substrate 2 having the coating of the low-melting glass frit paste 8 is subjected to primary firing in an open condition in which the coating is in contact with no matter thereby other than the lower substrate 2, preglazing the glass frit paste 8 to provide a vitrified sealant layer 9 as shown in FIG. 3(b). In the state shown in FIG. 3(b), the vitrified sealant layer 9 makes an intimate and firm bond with the zone of the lower glass substrate 2 to which it has been applied in the form of the low-melting glass frit paste 8. Since the step of primary firing is carried out in the open condition in which the paste 8 is free from engagement with any matter other than the lower substrate, the organic solvent and the organic binder in the paste 8 are completely vaporized and decomposed to escape in gaseous forms into the atmosphere. Thus, in the state shown in FIG. 3(b), that is, at the end of the step of primary firing, components having gasifying tendencies do not substantially remain in the vitrified sealant layer 9. In that state of the lower glass substrate 2, very small amounts of organic components which remain without flying away although they have been gasified, and air which remains between the glass frit powders without being liberated, are only present in the form of gas bubbles in the vitrified sealant layer 9. These gas bubbles, which are present in very small amounts in the vitrified sealant layer 9, fly completely away from the layer 9 when the lower glass substrate 2 is subjected together with the upper glass substrate 1 to secondary firing which will be described with reference to FIGS. 3(c) and 3(d). Therefore, the pair of the upper and lower glass substrates 1 and 2 forming the liquid crystal container can be completely sealed fluid-tight at their peripheral areas with the vitrified sealant layer 9 which is not substantially completely freed from residual gas bubbles.

Prior to the step of secondary firing, the upper glass substrate 1 shown in FIG. 3(c) is super-posed on the lower glass substrate 2, shown in FIG. 3(d), on the peripheral area of which the vitrified sealant layer 9 has been formed by fusion of the low-melting glass frit paste 8 by the heat of the primary firing. This superposition provides a stack as shown in FIG. 3(e), and the stack is subjected to secondary firing.

It will be seen that a paste prepared by mixing a low-melting glass frit with a binder and a solvent is coated on the sealing area of at least one of the glass substrates, and this glass substrate is subjected to primary firing, that is, to preglazing of the glass frit paste coating to turn this coating into a vitrified sealant layer in which residual gas bubbles are not substantially present or are present in very small amounts. This vitrified sealant is easily fusible at the temperature to primary firing and is also easily fusible at the secondary firing temperature which is generally somewhat lower than the former temperature, so that a very beautiful seal can be provided which is substantially free from residual gas bubbles. In addition, the effective sealing width of the seal in each of the mass-produced products can be accurately controlled and managed to improve the reliability of the sealing function. Thus, the effective display area can be maintained constant in all the mass-produced products, and the linearity of the inner frame lines defining the effective display area can be improved to provide a beautiful appearance of the display part, thereby enhancing the value of the products. The temperature of secondary firing is generally somewhat lower than that of primary firing as described hereinbefore. Thus, when an organic material which is relatively susceptible to heat is employed to form the liquid crystal orientation control films, these films may be formed after the step of primary firing so that they may not be thermally deteriorated.

The low-melting glass frit preferably employed in the present invention consists essentially of a mixture of 60 to 69% by mol of PbO, 20 to 30% by mol of $B_2O_3$, 0 to 10% by mol of ZnO, 0 to 6% by mol of CuO and 0.5 to 2% by mol of $Bi_2O_3$, and 1 to 5% by weight of a mixture of $Al_2O_3$ and $SiO_2$ added to 100% by weight of the former mixture. Nitrocellulose is used as a binder, and N-butylcarbitol acetate is used as a solvent in the present invention. The low-melting glass frit of the above composition is resolved into 0.3 to 0.7% by weight of nitrocellulose and then mixed with 10 to 20% by weight of N-butylcarbitol acetate, thereby preparing a low-melting glass frit paste. Alternatively, ethylcellulose and α-terpineol may be used as the binder and solvent respectively.

The temperature range of primary firing and secondary firing is between 400° C. and 430° C. Below this temperature range, the glass frit is not sufficiently fluidized, while above this temperature range, the glass frit will become crystalline resulting in impossibility of providing the predetermined cell gaps. The duration of firing ranges from 15 minutes to 45 minutes.

The low-melting glass frit paste thus prepared has a viscosity and an adhesion suitable for the purpose. Therefore, there is substantially no possibility of displacement of the two glass substrates from their relative positions when the two glass substrates are stacked with the glass frit paste sandwiched between their sealing areas, and the stack is subjected to firing to be brought into the final sealed condition by the single step as in the prior art manner of sealing. On the other hand, the vitrified sealant layer formed on one of the glass substrates as the result of the primary firing in the present invention does not exhibit any adhesive tendency with respect to the mating glass substrate although it is fixedly deposited on that glass substrate, since the solvent and the binder in the glass frit paste have been vaporized and decomposed to fly away therefrom, and the paste has been turned into the vitrified form. Therefore, in the step of secondary firing, suitable relative-position holding means must be used to hold the two glass substrate in their accurate relative positions so as to avoid relative displacement of the display electrodes on these glass substrates from their accurate relative positions. If it were possible to easily and inexpensively mass-produce the glass substrates of precise dimensions, a holding tool having dimensions corresponding to the external dimensions of the glass substrates could be used in the step of secondary firing to meet the purpose of holding the two glass substrates in their accurate relative positions. However, it is generally difficult to mass-produce glass substrates having precise external dimensions as a matter of fact.

The inventors have found expedient means which facilitates holding of the glass substrates in their accurate relative positions during the secondary firing and gives good results. This expedient means will be described with reference to FIGS. 4(a) and 4(b). At first, the low-melting glass frit paste 8 is coated on the sealing area of one of the glass substrates (which may be the upper glass substrate 1 although the lower glass substrate 2 is shown), and the glass substrate 2 is subjected to the primary firing or pre-glazing to turn the paste coating into the vitrified sealant layer 9, as shown in FIGS. 4(a) and 4(b). Then, a relative-position holding material, preferably, a low-melting glass frit paste 10 is coated by, for example, a mask printing method on portions external relative to the vitrified sealant layer 9, as shown in FIGS. 4(a) and 4(b). In the case of the mask printing method, this paste 10 may be preferably applied to the other glass substrate 1, since there does not occur such a problem that a print mask is damaged by the layer 9. The upper or mating glass substrate 1 is then superposed on the lower glass substrate 2 in a relationship in which the transparent electrodes on their electrode bearing faces are placed in the accurate relative positions, that is, the cells are accurately registered. Since the green glass frit paste 10 before being fired has the viscosity and adhesion suitable for the positioning purpose, the step of cell registration can be easily carried out, and during the secondary firing, the two glass substrates can be held in their accurate relative positions without being displaced from such positions until the seal is finally provided.

The low-melting glass frit paste 10 is applied to the portions exterior relative to the vitrified sealant layer 9. Therefore, the paste 10 would not enter the area of the liquid crystal container defined by the vitrified sealant layer 9 even when one of the glass substrates may be moved considerably relative to the other glass substrate in the step of cell registration. Also, the vapors liberated from the solvent in the paste 10 and the gases produced due to the decomposition of the binder in the paste 10 during the secondary firing would not enter the area of the liquid crystal container. Therefore, the application of the low-melting glass frit paste 10 does not deteriorate the display characteristic of the liquid crystal display element nor shorten the useful service life of the liquid crystal display element in any way.

The low-melting glass frit paste 10 is applied merely for the purpose of holding the two glass substrates in their accurate relative positions during the step of cell registration and the subsequent step of secondary firing. In view of the above purpose, this paste 10 need not be applied to the entire peripheral area of the lower glass substrate 2, and rather, the amount thereof should be as small as possible as far as it is enough to achieve the purpose of position holding. From the viewpoint of position holding, the glass frit paste 10 may include the binder in a greater amount than that in the paste 8 used for the sealing purpose, or it may be a non-vitreous organic adhesive which is easily decomposed during the secondary firing to fly away in the form of gases without contaminating the zone to which it is applied. It is however, desirable that the glass frit paste used for the sealing purpose is utilized also as the paste used for the position holding purpose when the former is enough to achieve the position holding purpose. The former paste has been found sufficiently effective for the position holding purpose according to the results of an experiment conducted by the inventors. Application of the glass frit paste 10 to the marginal edges of the lower or upper glass substrate or application of the paste 10 in such an excessive amount as to overflow from the marginal edges of the glass substrate is undesirable in that it results in deviations of the external dimensions of the liquid crystal display element from the designed values of the end products.

Preferred examples of the present invention will now be described, for the purpose of illustration.

EXAMPLE 1

A pair of glass substrates each formed with a display electrode in the form of a transparent conductive film in a predetermined pattern were prepared, and a low-melting glass frit paste 8 consisting essentially of a mixture of PbO, $B_2O_3$ and ZnO was printed by screen printing in a frame-like pattern on the peripheral area of one of the glass substrates. After suitably drying the first glass substrate at 110° C. to 140° C. for 20 minutes to 60 minutes, the first glass substrate was subjected to primary firing at 430° C. for 30 minutes to liberate or expel vapors and gases produced as the result of the decomposition of the binder and solvent and to turn the paste into a vitrified sealant layer fixedly deposited on the applied peripheral area of the first glass substrate. Subsequently, a liquid crystal orientation control film was formed in a predetermined pattern on the electrode formed on each of the two glass substrates. The other or second glass substrate was superposed on the first glass substrate. The stack was then subjected to secondary firing at 400° C. for 15 minutes to combine the upper and lower glass substrates into an integral assembly. Thereafter, a liquid crystal is injected into the assembly through a previously provided injection port, and the port was then plugged by a low-melting metal to complete a liquid crystal display element.

A comparative test was carried out to compare the liquid crystal display element thus obtained with a liquid crystal display element which as manufactured according to a prior art process including single firing treatment at 430° C. for 30 minutes. The test results proved that no thermal changes occurred on the liquid crystal orientation control films in the product of the present invention, and the product was completely free from mal-orientation and induced domains, whereas conspicuous thermal changes occurred on the orientation control films in the product manufactured according to the prior art process, and there were also many mal-oriented liquid crystal molecules and many induced domains in the latter product. Thus, the product manufactured according to the prior art process was greatly inferior in the quality of display to the product manufactured according to the process of the present invention.

A current conduction test was carried out on the product manufactured according to the process of the present invention. In this test, a DC voltage of 20 volts was externally applied across the transparent electrodes. The test results proved that the product was free from any derangement of liquid crystal molecule orientation, free from customary troubles including coloration of the electrodes and generation of gas bubbles and also free from induced domains. The product could withstand continuous conduction of current over more than 1,000 hours. Further, no changes occurred in the uniformity of orientation, in the contrast and in the liquid crystal temperature even when the product was left to stand in an atmosphere having a high temperature of 70° C. and a high relative humidity of 95% for more than 1,000 hours, and this proved that the product was highly reliable.

EXAMPLE 2

A low-melting glass frit paste 8 consisting essentially of a mixture of PbO, $B_2O_3$ and ZnO was applied to and fused and fixedly deposited by primary firing on the peripheral area of each of a pair of glass substrates. After forming a predetermined orientation control film on each of the glass substrates, the two glass substrate were then superposed on each other, and the stack was then subjected to secondary firing to combine the upper and lower glass substrates into an integral assembly. The conditions of drying, primary firing and secondary firing were the same as those in Example 1. A comparative test similar to that described in Example 1 was carried out to compare the product thus obtained with a product manufactured according to the prior art process. The test results proved also that the product manufactured according to the process of the present invention is far more excellent than the product manufactured according to the prior art process.

EXAMPLE 3

A low-melting glass frit paste 8 consisting essentially of $PbO-B_2O_3-ZnO$ was coated in a frame-like pattern on the peripheral area of at least one of a pair of glass substrates, and this glass substrate was then subjected to primary firing to fuse and fixedly deposit the glass frit paste 8 turned into a vitrified sealant layer. A low-melting glass frit paste 10 of the same composition as the low-melting glass frit paste 8 used for the sealing purpose was then applied to the substrate portions external relative to the vitrified sealant layer on at least one glass substrate as relative-position holding means. The two glass substrates were then superposed on each other in a relation in which the cells were accurately registered, so that these glass substrates could be held in their accurate relative positions during secondary firing by the relative-position holding means. The conditions of drying, primary firing and secondary firing were the same as those in Example 1. A comparative test similar to that described in Example 1 was carried out to compare the product thus obtained with a product manufactured according to the prior art process. The test results proved also that the product manufactured according to the process of the present invention is far more excellent than the product manufactured according to the prior art process.

EXAMPLE 4

A low-melting glass frit paste 8 consisting essentially of $PbO-B_2O_3-ZnO$ was coated on the peripheral area of one of a pair of glass substrates, and this glass substrate was then subjected to primary firing to fuse and fixedly deposit the glass frit paste 8 turned into a vitrified sealant layer. A low-melting glass frit paste 10 of the same composition as the low-melting glass frit paste 8 used for the sealing purpose was then printed by screen printing on the other glass substrate as relative-position holding means.

In this example, the low-melting glass frit paste 10 was printed by screen printing on the latter glass substrate as the relative-position holding means in order to prevent damage to the mask used for the screen printing. This is because the vitrified sealant layer deposited on the former glass substrate by the primary firing was as thick as about $20\mu$ to $30\mu$, and screen printing of the glass frit paste 10 on the former glass substrate as the relative-position holding means would damage the printing mask. The application of the glass frit paste 10 on the latter glass substrate could extend the useful service life of the printing mask by more than five times compared with its application on the former glass substrate.

It will be understood from the foregoing detailed description that liquid crystal display elements operable with a satisfactorily good display characteristic and exhibiting a beautiful external appearance can be manufactured at a high yield rate according to the process of the present invention.

Although the low-melting glass frit pastes 8 and 10 have been referred to as consisting essentially of a mixture of PbO, $B_2O_3$ and ZnO, those skilled in the art will readily understand that the pastes are in no way limited to the above composition. Further, although the present invention has been specifically described with reference to the use of the substrates of glass and the sealing and holding materials in the form of a low-melting glass frit, it is apparent from the principle of the present invention that the material of the substrates is in no way limited to the glass, and also, the sealing and holding materials are in no way limited to the low-melting glass frit.

What we claim is:

1. A process for the manufacture of a liquid crystal container for a liquid crystal display element in which a pair of substrates, each provided with transparent electrode means and liquid crystal orientation control means on its inner face, are sealed at their peripheral areas while defining a predetermined gap therebetween, said process comprising the steps of:
   applying a sealant to a predetermined zone of at least one of said substrates;
   subjecting said at least one of said substrates having said sealant thereon to primary firing in an open condition, thereby fusing and fixedly depositing said sealant on said at least one of said substrates having said sealant thereon;
   applying a relative-position holding material to at least a portion of at least one of said substrates such that, when said pair of substrates is properly positioned for sealing, said holding material is at a position external relative to said fused and fixedly deposited sealant; and
   superposing the mating substrate on said at least one of said substrates having said sealant thereon to bring the pair of said substrates into their accurate relative positions and subjecting the stack to secondary firing while holding said substrates in that relation, thereby integrally assembling and sealing said substrates at their peripheral areas with said sealant.

2. A process as claimed in claim 1, wherein said relative-position holding material applied to at least one of said substrates subsequent to the step of primary firing but prior to the step of secondary firing is the same in composition as said sealant fused and fixedly deposited in the step of primary firing.

3. A process as claimed in claim 1, wherein both said sealant and said relative-position holding material contain a binder, and said relative-position holding material applied to at least one of said substrates subsequent to the step of primary firing but prior to the step of secondary firing contains a binder in a greater amount than that contained in said sealant fused and fixedly deposited in the step of primary firing.

4. A process as claimed in claim 1, wherein said sealant is applied to one of said substrates prior to the step of primary firing, and said relative-position holding material is applied to the other of said substrates subsequent to the step of primary firing but prior to the step of secondary firing.

5. A process as claimed in claim 1, wherein said substrates are made of glass, and said sealant and said relative-position holding material include a low-melting glass frit.

6. A process as claimed in claim 2, wherein said substrates are made of glass, and said sealant applied to at least one of said substrates prior to the step of primary firing and said relative-position holding material applied to at least one of said substrates subsequent to the step of primary firing but prior to the step of secondary firing includes a low-melting glass frit.

7. A process for the manufacture of a liquid crystal container for a liquid crystal display element in which a pair of glass substrates, each provided with transparent electrode means and liquid crystal orientation control means on its inner face, are sealed at their peripheral areas while defining a predetermined gap therebetween, said process comprising the steps of:
   applying a low-melting glass frit paste to a predetermined zone of at least one of said glass substrates;
   subjecting each said glass substrate having said glass frit paste thereon to primary firing in an open condition, thereby fusing and fixedly depositing said low-melting glass frit paste on said glass substrate in the form of a vitrified sealant layer;
   applying a low-melting glass frit paste of the same composition as said fused and fixedly deposited glass frit paste to at least a portion of at least one of said glass substrates such that, when said pair of glass substrates is properly positioned for sealing, said glass frit paste of the same composition as said fused and fixedly deposited glass frit paste is at a position external relative to said vitrified sealant layer; and
   superposing the mating glass substrate on each said glass substrate having said vitrified sealant layer thereon to bring the pair of said glass substrates into their accurate relative positions using said low-melting glass frit paste applies subsequent to the step of primary firing as relative-position holding means and subjecting the stack to secondary firing to fuse said vitrified sealant layer and said glass frit paste applied subsequent to the step of primary firing while holding said glass substrates in that relation, thereby integrally assembling and sealing said glass substrates at their peripheral areas.

8. A process as claimed in claim 5 or 7, wherein said primary firing and said secondary firing are at a temperature between 400° C. and 430° C.

9. A process as claimed in claim 8, wherein said primary firing is at a higher temperature than said secondary firing.

10. A process as claimed in claim 8, wherein said low-melting glass frit consists essentially of a mixture of 60 to 69% by mol of PbO, 20 to 30% by mol of $B_2O_3$, 0 to 10% by mol of ZnO, 0 to 6% by mol of CuO and 0.5 to 2% by mol of $Bi_2O_3$, and 1 to 5% by weight of a mixture of $Al_2O_3$ and $SiO_2$ added to 100% by weight of the former mixture.

* * * * *